United States Patent [19]

Homma et al.

[11] Patent Number: 4,692,099
[45] Date of Patent: Sep. 8, 1987

[54] ROTARY COMPONENT OF A ROTARY DEVICE FOR HEAT ENGINES AND A METHOD OF MANUFACTURING THE SAME

[75] Inventors: Takahiko Homma, Aichi; Shigetaka Wada, Mie, both of Japan

[73] Assignee: Kabushiki Kaisha Toyota Chuo Kenkyusho, Aichi, Japan

[21] Appl. No.: 875,195

[22] Filed: Jun. 17, 1986

[30] Foreign Application Priority Data

Jun. 18, 1985 [JP] Japan .................................. 60-132779

[51] Int. Cl.$^4$ ......................... F01D 5/34; C04B 35/64
[52] U.S. Cl. ................................ 416/229 A; 416/230; 416/241 B; 29/156.4 R
[58] Field of Search ............... 416/229 R, 229 A, 230, 416/241 B; 264/63, 67; 29/156.4 R

[56] References Cited

U.S. PATENT DOCUMENTS

| | | | |
|---|---|---|---|
| 2,621,140 | 12/1952 | Bitterli et al. | 416/229 X |
| 4,550,004 | 10/1985 | Mizuno | 264/67 X |
| 4,552,510 | 11/1985 | Takeyuki | 416/241 B |
| 4,597,926 | 7/1986 | Ando et al. | 416/241 B X |

FOREIGN PATENT DOCUMENTS

| | | | |
|---|---|---|---|
| 2052793 | 5/1972 | Fed. Rep. of Germany | 416/241 B |
| 58-78908 | 11/1984 | Japan | 416/241 B |
| 613892 | 12/1948 | United Kingdom | 29/156.4 R |

Primary Examiner—Robert E. Garrett
Assistant Examiner—Joseph M. Pitko
Attorney, Agent, or Firm—Berman, Aisenberg & Platt

[57] ABSTRACT

A rotary component of a rotary device for heat engines, such as a turbine wheel of a gas turbine or a turbocharger, formed in an integral ceramic-fiber-reinforced sintered ceramic structure. The reinforcing ceramic fibers in the edges of the vanes of the rotary component are oriented radially to prevent the chipping of the edges of the vanes liable to occur in a direction perpendicular to the direction of thickness of the vanes. The rotary component is formed by molding a mixture of a ceramic powder, ceramic fibers and organic additive or additives in a mold having a cavity having the same shape as that of the rotary component except that the depth of sections of the cavity corresponding to the vanes is greater than the height of the vanes to be formed, sintering the molding, and cutting the vanes of the molding in a predetermined height.

8 Claims, 10 Drawing Figures

ROTARY COMPONENT OF A ROTARY DEVICE FOR HEAT ENGINES AND A METHOD OF MANUFACTURING THE SAME

BACKGROUND OF THE INVENTION

1. Field of the Invention

The present invention relates to a vaned rotary component of a rotary device for heat engines, such as the turbine wheel of a gas turbine or a turbocharger, and a method of manufacturing the same.

2. Description of the Prior Art

Recently, turbine wheels made of a ceramic material having high-temperature strength, such as silicone nitride or silicon carbide, have been employed in heat engines such as gas turbines and turbochargers to improve the thermal efficiency of heat engines through the increase of the operating temperature and to substitute ceramics for rare resources.

As is generally known, a turbine wheel is manufactured by casting a heat-resistant alloy containing nickel and chromium as the principal components. However, the heat-resistance of such metal is not high, and hence the operating temperature of the heat engine provided with the metallic turbine wheel is limited. In order to meet the requirement for the improvement of the thermal efficiency of the heat engine, turbine wheels formed of a ceramic material having high strength and superior to metals in heat-resistance, such as silicon nitride or silicon carbide, have become manufactured through injection molding process or slip casting process.

A ceramic turbine wheel is formed of a dense sintered body through the processes of preparing a fluidized mixture of a pulverized ceramic material and an organic substance or water, injection-molding or casting the fluidized mixture to form a molding having a desired shape, heating the molding to remove the additives including the organic substance or water, and sintering the molding.

The turbine wheel is driven at a high speed by high-temperature gases produced by the combustion of fuel in a combustor or a combustion chamber to produce power. In a turbocharge, for instance, the maximum circumferential speed of the turbine wheel is as high as 600 m/sec. Combustion gases contain minute particles, such as dust contained in the air used for combustion and metal oxide scales flaked off from the inner surface of the combustion gas passage, which collide against the turbine wheel rotating at high speed. With a turbine wheel formed of a metal having high impact resistance, the impact of particles dents only the peripheral portion of the turbine wheel moving at the highest circumferential speed, and hence no significant problem affecting the performance of the turbine wheel is not caused. However, since the ceramic turbine wheel is brittle, the impact of particles on the ceramic turbine wheel causes chipping or tip damages in the peripheral portions of the vanes of the ceramic turbine wheel, whereby the performance of the ceramic turbine wheel is deteriorated.

In order to obviate such problems in the turbocharger, for instance, means for discharging foreign matters contained in the combustion gas supplied to the turbocharger outside the scroll casing is proposed in Japanese Unexamined Patent Publication No. 22025/1985, in which a circumferential foreign matter guiding groove is formed in the inner surface of the scroll casing, and a foreign matter discharging opening is formed at the end of the foreign matter guiding groove, and thereby the foreign matters are guided along the foreign matter guiding groove and are discharged through the foreign matter discharging opening outside the scroll casing. However, this means is unable to eliminate the foreign matters completely so that the turbine wheel will not be damaged by the foreign matters. After all, it has been desired that the strength of the ceramic turbine wheel itself be enhanced.

SUMMARY OF THE INVENTION

Accordingly, it is an object of the present invention to provide a ceramic rotary component for a heat engine, having vanes with reinforced edges which are not chipped by the impact of particles thereon.

It is another object of the present invention to provide a method of efficiently manufacturing such a reinforced ceramic rotary component for a heat engine.

A vaned rotary component according to the present invention is composed of a ceramic body containing ceramic fibers. The rotary component according to the present invention is characterized by the ceramic fibers 3 of peripheral portions 131 of vanes 13 being disposed with the respective longitudinal axes oriented toward the edges of the vanes, as illustrated in FIG. 1.

The rotary component of the present invention containing thus oriented ceramic fibers 3 is obtained through processes of forming a molding by filling a ceramic material containing ceramic fibers in a mold having extra cavities 22 extending radially outward from fin cavities 21, respectively, as shown in FIG. 8, subjecting the molding to a degreasing treatment, burning the degreased molding to produce a sintered article, and removing the extra portion of each vane after molding or after sintering.

The above-mentioned ceramic material is silicon nitride, silicon carbide, alumina, zirconia or sialon. The ceramic fibers are those of silicon carbide, silicon nitride, alumina, graphite or boron nitride or those of a plurality of materials among these materials.

Desirable ceramic fibers are those having a diameter in the range of 0.3 to 50 μm and a length in the range of 5 to 1000 μm. Fibers thinner and shorter than those desirable ceramic fibers are less effective for reinforcement, while fibers thicker than those desirable ceramic fibers are incapable of reinforcement, rather reduce the strength of the article. Fibers longer than those desirable ceramic fibers are broken and are reduced to powder during the kneading and molding of the material.

The suitable ceramic fiber content of the material is on the order of 5 to 70% by weight. Smaller content is insufficient in the effect of reinforcement, while greater content reduces the strength of the article.

Among the portions of the vaned rotary component, the edges of the vanes have the greatest circumferential speed, and hence the edges of the vanes are most liable to be chipped by the impact of foreign matters. In most cases, the edges are chipped substantially in a direction perpendicular to the radial vanes, namely, in Y-direction in FIG. 2. According to the present invention, the ceramic fibers are oriented within the vanes in a radial direction, namely, in X-direction crossing the direction of chipping. Therefore, the ceramic fibers prevent chipping effectively.

In injection-molding or slip-casting a rotary component, the ceramic fibers 3 contained in the ceramic material flowing in a mold cavity 21 for a vane tend to extend in a direction of less resistance, namely, along the direction of flow of the ceramic material, while the cermaic fibers 3 tend to extend in a direction substantially perpendicular to the direction of flow of the ceramic material in the bottom of the mold cavity 21, as illustrated in FIGS. 9A and 9B.

According to the present invention, an extra cavity 22 is extended from a cavity 21 for a vane as illustrated in FIG. 8, and an extra portion molded in the extra cavity 22 is removed after molding as illustrated in FIGS. 6 and 7. Accordingly, in a finished ceramic rotary component, the ceramic fibers in the edges of the vanes are oriented radially. Thus, the ceramic fibers prevent the chipping of the edges of the vanes by particles during the operation of the ceramic rotary component.

The above and other objects, features and advantages of the present invention will become more apparent from the following description of a preferred embodiment thereof taken in conjunction with the accompanying drawings.

DESCRIPTION OF THE PREFERRED EMBODIMENT

A ceramic material was prepared by mixing 30% by weight of silicon carbide fibers approximately 0.6 μm in diameter and 10 to 20 μm in length, and 70% by weight of silicon nitride powder of 0.8 μm in average particle size. A mixture of 100 part by weight of the ceramic material and 23 part by weight of a thermoplastic resin and a platicizer was kneaded under heat and crushed to produce ceramic pellets for injection-molding.

Figure 4:
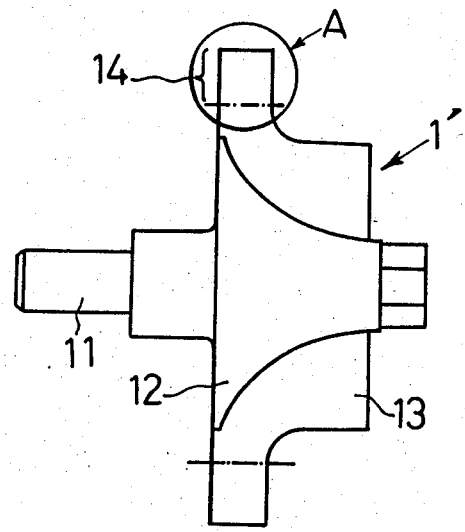
FIG. 4 is a side elevation of the rotary component as molded.
Figure 5:
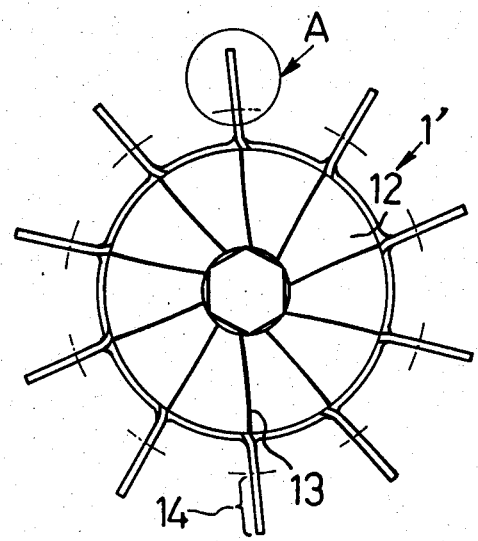
FIG. 5 is a front elevation of the rotary component as molded.
Figure 8:
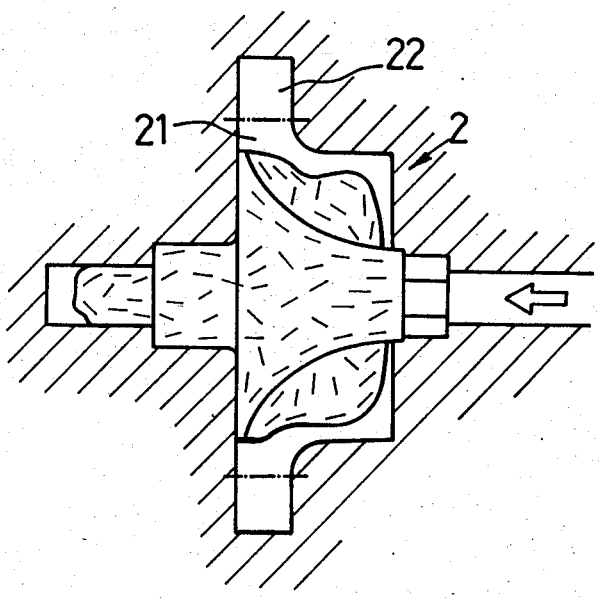
FIG. 8 is a schematic sectional view of a mold during injection-molding of the rotary component of FIG. 1.

As shown in FIG. 8, a mold 2 for injection-molding a turbine wheel according to the present invention has extra cavities 22 respectively extending radially from cavities 21 for vanes. The ceramic pellets were injected into the mold 2 in the direction of an arrow to obtain a turbine wheel molding 1' comprising a shaft 11, a hub 12 and a plurality of radial vanes 13, as shown in FIG. 4 and FIG. 5.

The turbine wheel molding 1' was heated in a degreasing furnance to remove the organic additives through thermal decomposition and the turbine wheel molding 1' was sintered.

Figure 1:
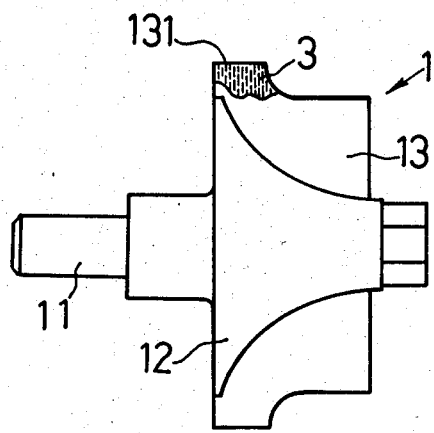
FIG. 1 is a partly cutaway side elevation of a rotary component of a rotary device for a heat engine, in a preferred embodiment, according to the present invention.
Figure 2:
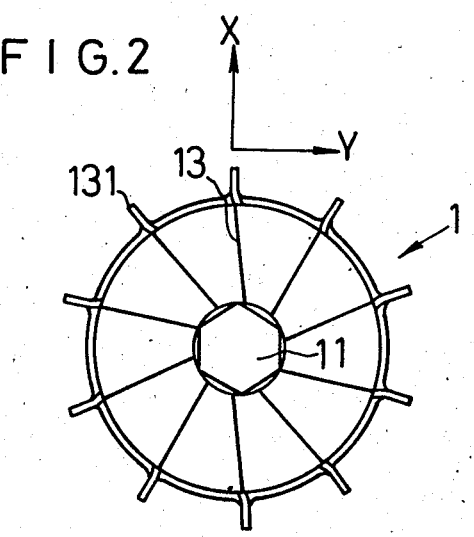
FIG. 2 is a front elevation of the rotary component of FIG. 1.
Figure 3:
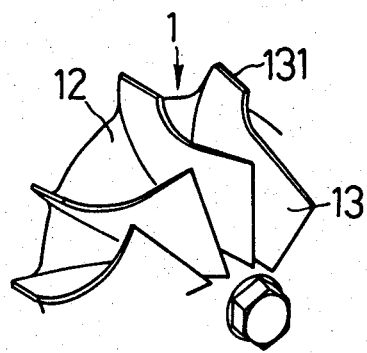
FIG. 3 is a perspective view of an essential portion of the rotary component of FIG. 1.

The extra portions 14 of the vanes of the sintered turbine wheel was removed by grinding after sintering to obtain a ceramic turbine wheel 1 comprising a shaft 11, a hub 12 and a plurality of vanes 13 radially extending from the hub 12, and having an outside diameter of 60 mm, as shown in FIGS. 1 to 3.

Figure 9A:
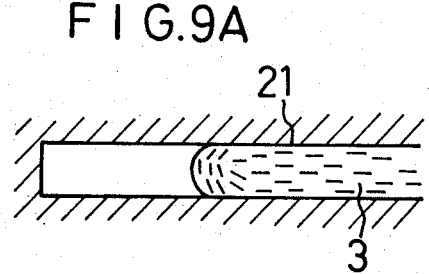
FIGS. 9A and 9B are fragmentary sectional views showing the direction of extension of ceramic fibers in a ceramic material flowing in a mold cavity for a vane during injection-molding.
Figure 9B:
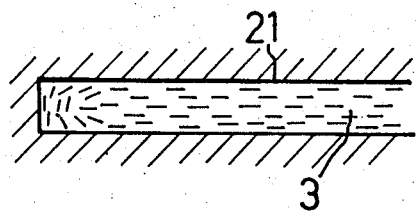

FIGS. 9A and 9B show the mode of flow of the ceramic material containing ceramic fibers in a mold during injection-molding. As illustrated in FIG. 9A', while the ceramic material flows in a cavity 21 for a vane of the mold 2, the ceramic fibers 3 extend in the direction of less resistance, namely along the direction of flow of the ceramic material. However, in the bottom of the cavity 21, the ceramic fibers 3 extend in a direction perpendicular to the direction of flow of the ceramic material. Accordingly, when a turbine wheel molding is formed in a mold having a cavity having exactly the same shape as that of a molding to be formed, the ceramic fibers are oriented in the direction of thickness of the vanes in the edges of the vanes.

According to the present invention, a molding having extra cavities 22 radially extending beyond the cavities 21 for the vanes as shown in FIG. 8 is used for molding the ceramic material, and the extra portions 14 (FIGS. 6 and 7) formed in the extra cavities 22 are removed after molding. Accordingly, the ceramic fibers in the edges of the vanes are oriented in the direction of flow of the ceramic material during injection-molding, namely, radially and in parallel to the side surfaces of the vanes.

The turbine wheel of the present invention thus obtained was mounted on a turbocharger and the turbine wheel 1 was rotated at 120,000 rpm by the exhaust gas of an engine, in which the circumferential speed of the circumference of the turbine wheel (edges of the vanes) was approximately 380 m/sec. To measure the impact resistance of the vanes under such an operating condition, iron oxide particles each having a weight in the range of 10 to 20 mg were mixed into the exhaust gas five times by approximately 100 mg for each tiem. Dents were formed in the edges of the vanes of the turbine wheel 1 by the iron oxide particles. However, the vanes were not chipped at all.

Figure 6:
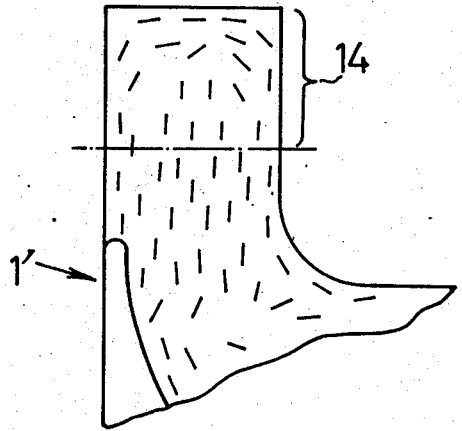
FIGS. 6 and 7 are a cross section, respectively, of a portion A of FIGS. 4 or 5, showing the orientation of ceramic fibers in the vane of the rotary component of FIG. 1.
Figure 7:
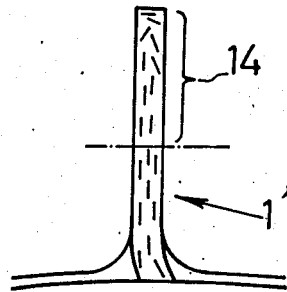

The section of the edge of the vane was observed with a scanning electron microscope. The ceramic fibers were oriented in the same direction as illustrated in FIGS. 6 and 7.

A ceramic fiber reinforced turbine wheel molded in a mold having a cavity of the same shape as that of a molding to be molded and not having such extra cavities and manufactured under the same conditions as those for manufacturing the turbine wheel of the present invention was tested under the same conditions as those for the turbine wheel of the present invention for comparison. Dents were formed in the edges of the vanes and some of the vanes were chipped minutely.

As is apparent from the foregoing description, the present invention prevents the chipping of the vanes of the rotary component of a rotary device for heat engines during operation by forming the rotary component in a ceramic fiber reinforced sintered ceramic structure and by radially orienting the reinforcing ceramic fibers in the edges of the vanes.

The rotary component having vanes reinforced by radially oriented ceramic fibers can be manufactured at high productivity by molding the molding of the rotary component in a mold having extra cavities radially extending beyond cavities for the vanes, respectively.

The shape of the extra cavities of the mold is not limited to particular shapes; the extra cavities may be of any shape as far as the ceramic material is allowed to flow farther beyond the portions of cavities corresponding to the edges of the vanes.

Although the invention has been described in its preferred form with a certain degree of particularity, it is to be understood to those skilled in the art that many variations and changes are possible in the invention without departing from the scope and spirit thereof.

What is claimed is:

1. In a rotary component of a rotary device for heat engines, formed in an integral ceramic-fiber-reinforced sintered ceramic structure comprising:
    a shaft;
    a hub; and
    vanes radially extending from the circumference of the hub, the improvement wherein:
    reinforcing ceramic fibers are distributed in an edge portion of each of the vanes, including side surfaces of each of the vanes, and are oriented substantially parallel to the side surfaces of each of the vanes and radially outward of each of the vanes.

2. A rotary component according to claim 1, wherein ceramic mateial forming the matrix of said rotary component is silicon nitride, silicon carbide, alumina, zirconia or sialon, and the ceramic fibers reinforcing said rotary component are those of silicon nitride, silicon carbide, alumina, graphite or boron nitride.

3. A rotary component according to claim 1, wherein said reinforcing ceramic fibers have a diameter in the range of 0.3 to 50 μm and a length in the range of 5 to 1000 μm.

4. A rotary component according to claim 1, wherein the rotary component is designed for use as a turbine wheel of a gas turbine.

5. A rotary component according to claim 1, wherein the rotary component is designed for use as a turbine wheel of a turbocharger.

6. A rotary component according to claim 1, wherein the ceramic fiber content is of the order of 5 to 70% by weight.

7. A method of manufacturing a rotary component of a rotary device for heat engines, formed in an integral ceramic-fiber-reinforced sintered ceramic structure comprising a shaft, a hub, and vanes radially extending from the circumference of the hub, reinforcing ceramic fibers in the edges of the vanes being oriented substantially in parallel to the side surfaces of the vanes and radially outward of the vanes, which comprises the steps of:
    preparing a mold having a cavity of a shape corresponding to that of the rotary component to be formed except that the depth of sections of the cavity corresponding to the vanes is greater than the height of the vanes to be formed;
    injecting a fluidized mixture of a ceramic powder, ceramic fibers and an organic additive or additives into the cavity of the mold;
    heating a molding thus molded to remove the organic additive or additives;
    sintering the molding after the removal of the organic additive or additives to produce a sintered molding; and
    cutting the outer extremities of the vanes to form the vanes in a predetermined height after said molding or said sintering.

8. A method according to claim 7, wherein said ceramic powder is that of silicon carbide, silicon nitride, alumina, zirconia or sialon, and said ceramic fibers are those of silicon carbide, silicon nitride, alumina, graphite or boron nitride.

* * * * *